United States Patent
Schmid et al.

[19]

[11] Patent Number: 6,044,802
[45] Date of Patent: Apr. 4, 2000

[54] VETERINARY RECOVERY COLLAR

[75] Inventors: Linda Anne Schmid; John A. Rasile, both of Mission Viejo, Calif.

[73] Assignee: The Bonafido Company, Inc., Mission Viejo, Calif.

[21] Appl. No.: 09/357,334

[22] Filed: Jul. 20, 1999

Related U.S. Application Data

[60] Provisional application No. 60/133,719, May 12, 1999.

[51] Int. Cl.[7] .................................................. A01K 27/00
[52] U.S. Cl. ............................................................. 119/856
[58] Field of Search ..................................... 119/856, 729, 119/850, 855, 908; 54/79; 128/878, 880, 882; 2/46, 47, 48, 98, 116, 127, 129, 131, 132

[56] References Cited

U.S. PATENT DOCUMENTS

| | | | |
|---|---|---|---|
| 986,728 | 3/1911 | Lee . | |
| 3,072,098 | 1/1963 | Boemle | 119/856 |
| 4,476,814 | 10/1984 | Miller | 119/856 |
| 5,133,295 | 7/1992 | Lippincott . | |
| 5,161,352 | 11/1992 | Schneider et al. | 54/79 |
| 5,349,927 | 9/1994 | Campbell | 119/850 |
| 5,697,328 | 12/1997 | Hunter . | |
| 5,787,842 | 8/1998 | Shmoldas . | |

*Primary Examiner*—Thomas Price
*Attorney, Agent, or Firm*—Hoffman, Wasson & Gitler

[57] ABSTRACT

A veterinary recovery collar prevents an animal from licking or biting wounds, sores or stitches on its body and scratching its head with its paws. The collar has the shape of a round pillow with a central aperture. A shawl extends into the central aperture and has a drawstring. The collar is placed over the animal's head and is retained in place by drawing, or pulling, the drawstring that is laced through the shawl. The resulting collar creates a substantive barrier, preventing the animal from reaching its body with its head, or reaching its head with its paws. The collar is soft, comfortable and affords the animal freedom of mobility, an unimpaired field of vision, and the ability to carry on most normal activities.

8 Claims, 3 Drawing Sheets

VETERINARY RECOVERY COLLAR

This application claims the benefit of provisional application Ser. No. 60/133,719, filed May 12, 1999.

BACKGROUND OF THE INVENTION

Elizabethan collars have been used for many years by veterinarians to keep animals from licking or biting wounds or sores. Many animals will bite their wounds, and this hinders the proper healing process. The Elizabethan collar is an opaque plastic cone having a frustro-conical shape, and it looks much like a lampshade. The small end of the collar is placed around the animal's neck, and the collar surrounds the sides of the animal's head. Although the Elizabethan collar is effective in preventing an animal from biting or licking wounds or scratching wounds on its head with its paws, it is very uncomfortable for the animal. It makes eating, sleeping, moving and seeing very difficult. Many animals feel threatened, depressed or disoriented while wearing the collar. Animals often bang into doors and walls because of the restricted view.

A modified type of Elizabethan collar is disclosed in U.S. Pat. No. 5,133,295 (Lippincott). It is made of two disks of non-resilient material that are secured about an animal's neck. The non-resilient material is thin and floppy and does not have the ability to return to its original position, and therefore does not present an effective barrier to keep an animal from turning its head to reach its body. The two disks are sewn together at their central aperture but otherwise move independently.

Another restraining collar is disclosed in U.S. Pat. No. 4,476,814 (Miller). The collar is made of a foam material such as polyurethane, polystyrene or foamed natural or synthetic rubber. The collar is toroidal in shape and is provided with a gap 22. The collar has a central neck-receiving space 16. The gap is wide enough so that the collar to be placed on the neck of an animal. The collar includes a drawstring extending through the body of the collar and is used to close the gap. The central neck-receiving hole 16 is not adjustable in size. Without being adjustable for size, the collar will most likely leave a space between the aperture and the neck. The collar will be able to slip up and down the neck, and it is possible that an animal can have a paw become entrapped between the collar and its neck.

It is an object of the invention to provide a restraint collar that prevents an animal from interfering with the healing process of its own wounds or sores.

It is another object of the invention to provide a restraint collar that is adjustable in size.

It is a further object of the invention to provide a restraint collar that is made of soft, resilient material.

It is still another object of the invention to provide a restraint collar that is easy to use for the animal's owner, and yet comfortable for the animal.

It is yet another object of the invention to provide a restraint collar that is inexpensive and easy to manufacture.

These and other objects of the invention will become clear to one of ordinary skill in the art after reviewing the disclosure of the invention that follows.

SUMMARY OF THE INVENTION

The collar is made from one or two resilient foam disks. The disks are covered in a waterproof cover. The collar has the shape of a round pillow with a central aperture. A shawl extends into the central aperture and has a drawstring. The collar is placed over the animal's head and retained in place by tightening a drawstring that is laced through the shawl. It creates a substantive barrier, preventing the animal from reaching its body with its head, or reaching its head with its paws. The collar is soft, comfortable and affords the animal freedom of mobility, an unimpaired field of vision, and the ability to carry on most normal activities.

DETAILED DESCRIPTION OF THE DRAWINGS

Figure 1:
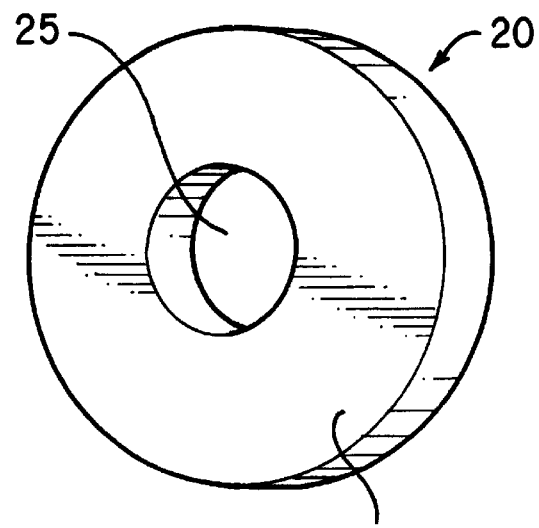
FIG. 1 depicts the large disk used to make the collar interior.

Turning to the drawings, FIG. 1 shows the large disk 20 that is used to form the collar. This disk is made of resilient foam material and has a central aperture 25 and a planar side 27.

Figure 2:
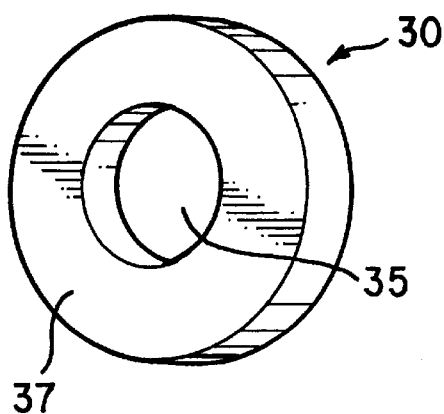
FIG. 2 depicts the small disk used to make the collar interior.

FIG. 2 depicts a small disk 30. This small disk is optional and can be used with the large disk to form the internal structure of the collar. This small disk is also made of resilient foam material and has a central aperture 35 that has the same size as the central aperture 25 of the large disk 20. Also similar to the large disk 20, the small disk 30 has a planar side 37.

Figure 3A:
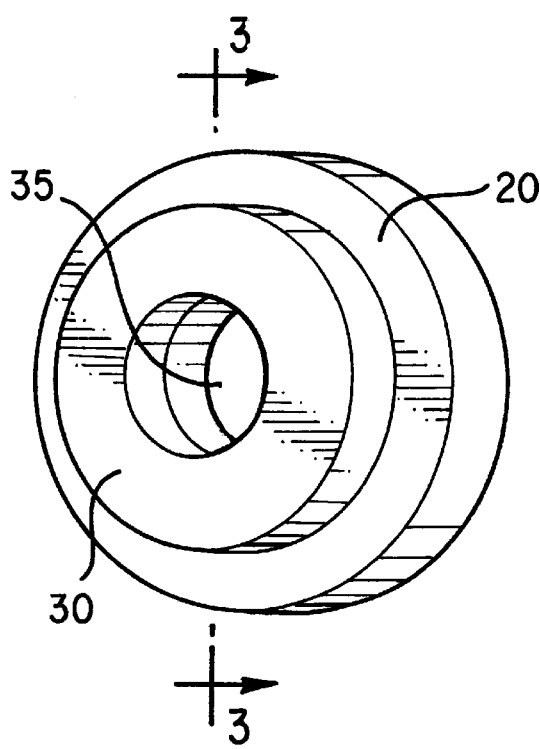
FIG. 3A is a plan view of the large and small disks of the present invention joined to one another.

FIG. 3A shows the two disks 20,30 joined to one another. They can be glued together or the pieces can be molded as one piece.

Figure 3B:
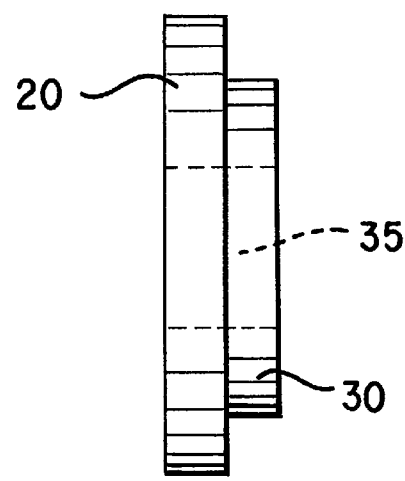
FIG. 3B is a cross-sectional view taken along line 3.

FIG. 3B shows the cross-section along line 3—3 of FIG. 3A. As can be seen from this cross-sectional view, the large disk central aperture 25 and the small disk central aperture 35 are aligned with one another. The animal's head is placed through the central apertures to secure the collar to the animal. The use of two disks gives the collar additional thickness that enhances the collar's ability to prevent the animal from reaching wounds but the movement between the two disks allows the animal to fit through tight spaces.

Figure 4:
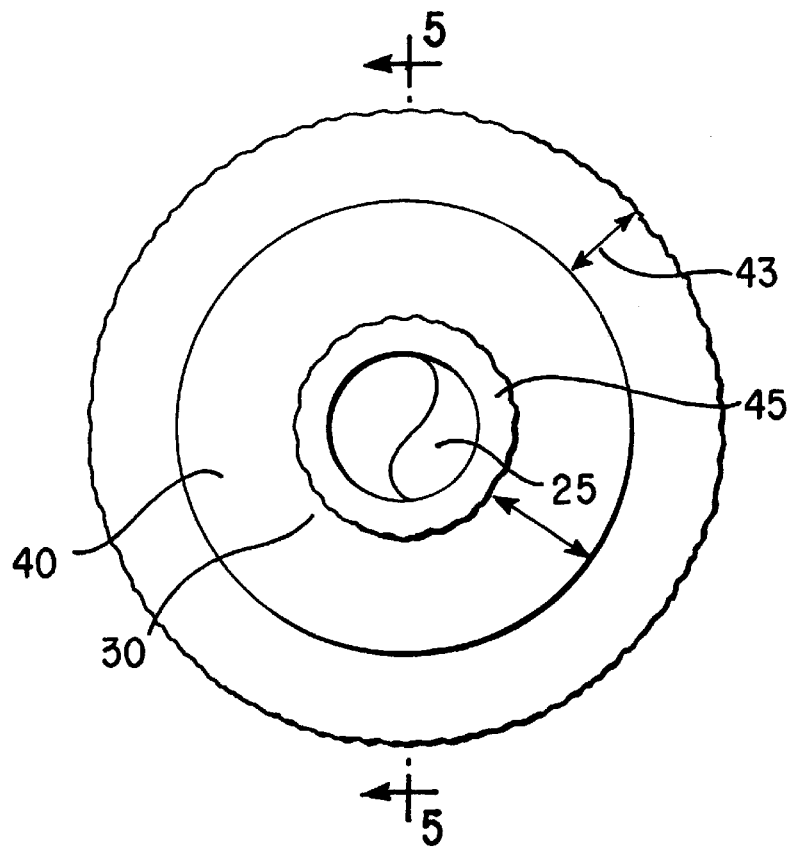
FIG. 4 is a plan view of the fully assembled collar.

FIG. 4 is a plan view of the collar. The single large disk, or the large disk in combination with the small disk, are provided with a cover 40. This cover is preferably a waterproof, easily cleaned material, that won't retain odors and can be embellished with designs. One such material is vinyl. The covered collar will not cut, scrape or mark items it contacts, such as a person's leg or furniture. About the outside perimeter the cover is provided with a hem 43. Around the inner diameter of the foam disk, the cover has a shawl 45. The purpose of the shawl will be described with reference to FIG. 5.

Figure 5:
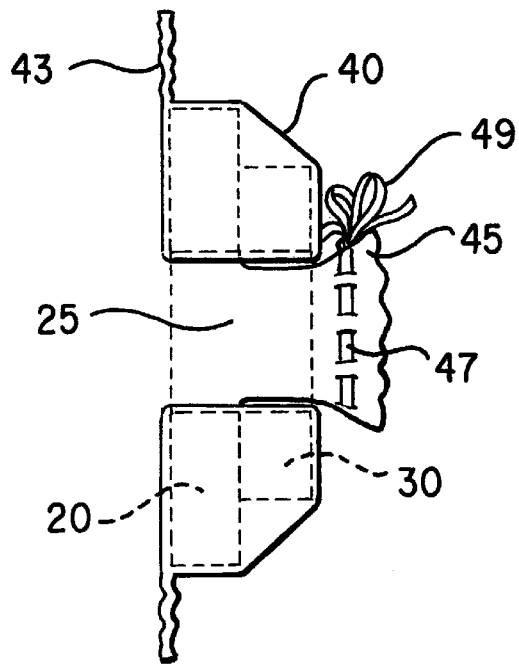
FIG. 5 is a cross-sectional view taken along line 5—5 in FIG. 4.

FIG. 5 shows the cross-sectional view taken along line 5—5 of FIG. 4. Seen here is the relationship between the cover 40 and the large disk 20 and small disk 30. The hem 43 can be seen. The shawl 45 is shown as it extends into the central aperture of the large and small disks. As can be seen, the shawl 45 is provided with holes 47 through which a drawstring 49 is laced. After the collar is placed over the animal's head and placed about the neck, the drawstring is pulled, and the diameter of the shawl is reduced to provide a tight, but comfortable, fit about the animal's neck.

Figure 6:
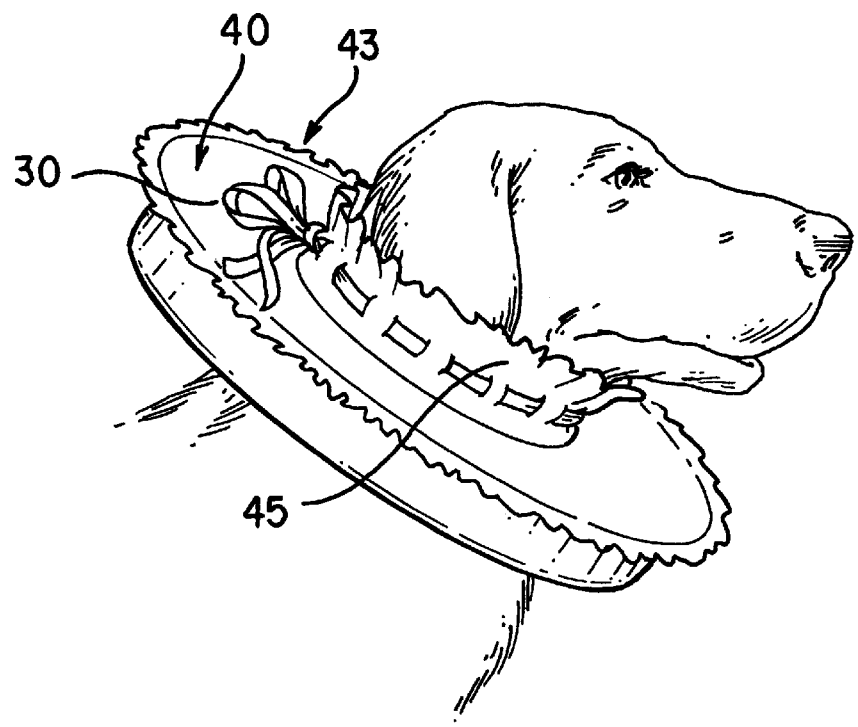
FIG. 6 depicts the collar in use.
Figure 7:
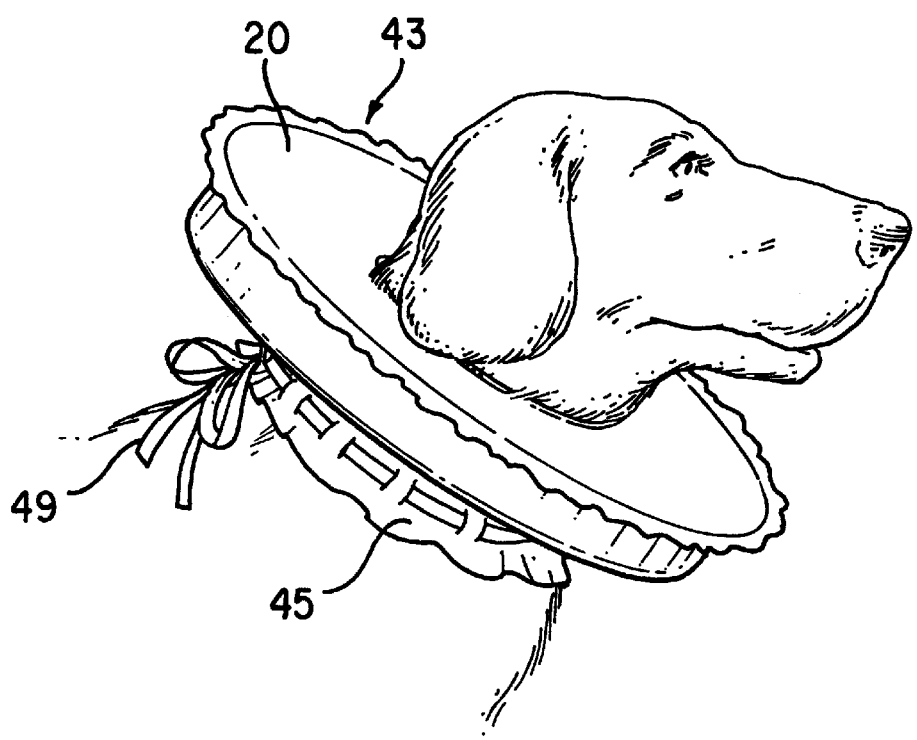
FIG. 7 depicts the collar in an alternative use.

A depiction of the collar, as used on the animal, is shown in FIG. 6. In this view, it can be seen that the shawl extends upward from the collar, towards the animal's head and the drawstring is accessible by the animal's owner to be adjusted to the correct length and tied. An alternative placement of the collar on an animal's neck is shown in FIG. 7. In this embodiment, the shawl extends downward from the collar, away from the animal's head. Also in this embodiment, it can be seen that the drawstring remains accessible to the animal's owner.

The invention has been described with reference to a preferred embodiment, but such a description is not intended to be limiting. Variations and modifications would be obvious to one of ordinary skill in the art without deviating from the spirit of the invention. The invention is defined by the appended claims, which should be liberally construed in a manner consistent with the spirit and scope of the instant invention.

We claim:

1. A veterinary recovery collar, comprising
   a first resilient disk, said disk having a central aperture;
   a shawl connected to said central aperture and extends therefrom for engaging an animal's neck;
   a drawstring in said shawl for adjusting the size of the shawl.

2. The recovery collar of claim 1, further comprising a cover surrounding said first disk.

3. The recovery collar of claim 2, wherein said shawl is an extension of said cover.

4. The recovery collar of claim 2, wherein said cover is a waterproof, odor-proof material.

5. The recovery collar of claim 4, wherein said cover is vinyl.

6. The recovery collar of claim 1, further comprising a second disk having a central aperture, said second central aperture concentric with said first central aperture.

7. The recovery collar of claim 6, further comprising a cover surrounding said first and second disks.

8. The recovery collar of claim 1, wherein said first disk is foam.

\* \* \* \* \*